July 7, 1959  H. LINDEMANN  2,893,275
CENTERING DEVICE FOR CLAMPING WORKPIECES
Filed Feb. 14, 1957

INVENTOR
HANS LINDEMANN
BY MICHAEL S. STRIKER
ATTORNEY

United States Patent Office 2,893,275
Patented July 7, 1959

2,893,275

CENTERING DEVICE FOR CLAMPING WORKPIECES

Hans Lindemann, Bielefeld, Germany, assignor to Th. Calow & Co., Bielefeld, Germany, a company of Germany Application February 14, 1957, Serial No. 640,103

7 Claims. (Cl. 77—63)

The present invention relates to improvements in devices for centering workpieces of circular, angular or similar cross section and mounting them in such central position. More particularly, the invention relates to such centering devices in which at least two parts are movable relative to each other, one part of which has a recess of prismatic shape which extends symmetrically to the direction of its movement, while the other part has a surface extending transverse to the direction of movement of the first part.

Prior to this invention, there have been various centering devices of a type in which the workpiece was held between two jaws which were adjustable relative to each other by means of a spindle provided with left and right-hand screw threads, and one of which had a V-shaped gripping recess. Such spindle-operated centering devices have, however, the disadvantage of working properly only if the parts driven by the spindles are movable substantially free of any play, and also provided that the workpiece after being clamped in a central position is not subjected to any vibrations. They also have the disadvantage that the forces to be transmitted by the spindle of such centering device depend upon the surface pressure exerted thereby upon the spindle nut, and that the spindle with its right and left-hand threads is not disposed within but outside of the direction of force exerting the clamping action upon the workpiece.

Other types of centering devices known prior to the invention were provided with jaws similar as described which were adjustable relative to each other by a system of levers or by hydraulic means in cooperation with such levers. All of these devices have the disadvantage of requiring a special adjustment of the means acting upon the jaws so as to change their position relative to each other. Furthermore, all such leverage systems allow for a certain resiliency which easily results in dangerous vibrations, particularly if the respective clamping device is applied to cutting machines, and they also require any play resulting from such vibrations to be compensated immediately as the accurate central position of the workpiece can otherwise not be maintained. Centering devices in which the clamping jaws are controlled by hydraulic means have the additional disadvantage that oil leaks therein cannot be totally avoided and that the loss in pressure thus caused results in inaccurate centering of the workpiece. Finally, these and all other centering devices of the prior art have the disadvantage of requiring a large number of relatively movable parts which are apt to cause breakdowns and inaccurate operation, and of being rather complicated in design and therefore being quite expensive.

It is an object of the present invention to provide a centering device which avoids all of the disadvantages of similar devices and apparatus previously known and excels by its simple mechanical design and the fact that it is easily operated and always at the greatest possible accuracy, and is of relatively low cost.

With these objects in view, the invention consists in the provision of a centering device comprising two clamping members or jaws which are movable relative to each other, and each of which has a surface which engages with one surface of the other member, and in designing one of the two members so as to be easily slidable along a surface which is inclined relative to the direction of movement of the other member.

Another feature of the invention consists in the provision of a suitable spring which has the tendency to move the clamping member which is slidable along the inclined surface, so that its clamping surface extending perpendicular to the direction of movement of the other member will then move toward the latter.

Further objects, features, and advantages of the present invention will be apparent from the following detailed description thereof, particularly when read with reference to the accompanying diagrammatical drawings showing three different embodiments of the invention, in which—

Fig. 2 shows a similar view of a modification of the invention in which one of the clamping members is acted upon by a spring; while

Figure 1:
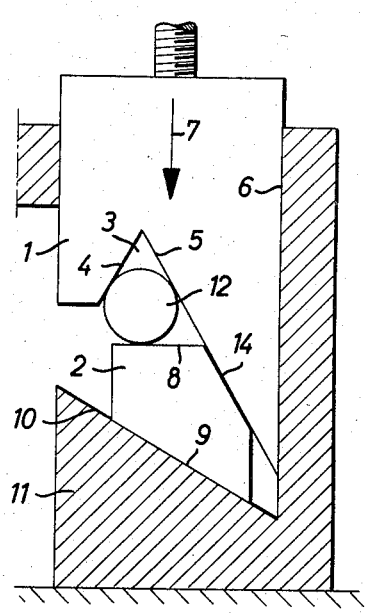
Fig. 1 shows a side view of a clamping device according to the invention as seen in the axial direction of the workpiece.

Referring to the drawings, and first particularly to Fig. 1, the clamping device according to the invention consists of the two clamping members or jaws 1 and 2. Clamping member 1 is provided with a symmetrical prismatic recess 3, the two surfaces 4 and 5 of which are inclined toward each other at an angle of 60°. Surface 5 is extended so as to intersect with a surface 6 of a stationary member on which clamping member 1 is mounted and along which it is adapted to slide in the direction shown by arrow 7. Clamping member 2 has a work-engaging surface 8 which extends perpendicular to the direction 7 and engages with a stationary member 11 along the surface 10 thereof which extends at the same oblique angle as surface 9. If desired, this stationary member 11 may form an integral part of the mounting member, the surface 6 of which forms the guiding surface of member 1.

If a rod 12 or the like is to be secured in a fixed position by clamping members 1 and 2, it is merely necessary to move member 1 in the direction toward rod 12. Such movement is simultaneously transmitted through the inclined surface 5 to member 2 which slides along the stationary surface 10 in a direction away from surface 6 so that its clamping surface 8 moves in a direction opposite to that shown by arrow 7. Both clamping members 1 and 2 are thus moved into engagement with rod 12 to clamp the same securely.

Figure 2:
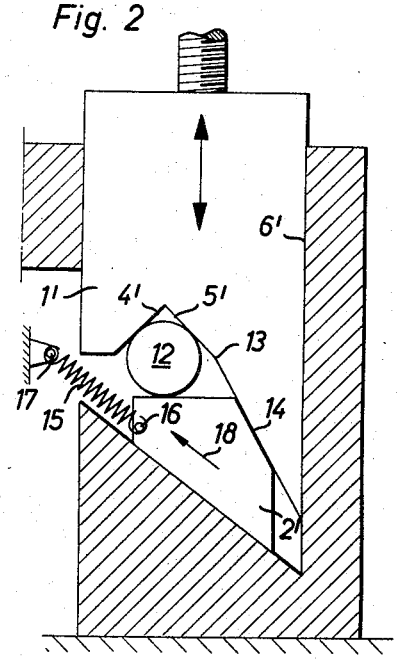

The embodiment of the invention as shown in Fig. 2 differs from that shown in Fig. 1 primarily by the fact that the clamping surfaces 4' and 5' of member 1 are disposed at an angle of 90° to each other. Consequently, the inclined surface 14 of member 1', which is disposed at substantially the same angle to the stationary guide surface 6' as surface 5 in the first embodiment according to Fig. 1, does not extend in a straight direction to its point of intersection with surface 4' but only to a point 13 from which it then continues at a slight angle relative to surface 5'. The increase in angularity of surfaces 4' and 5' also requires a similar increase in the angularity of the inclined surface 9' of member 2' engaging with the corresponding surface of the stationary member 11. Since due to such increased angularity a movement of clamping member 1' in the direction shown by the arrow would not automatically result in a movement of clamping member 2' in the direction of arrow 18, the latter is provided with a spring 15 which is attached at one end to a pin 16 on member 2 and at the other end to a stationary member at 17, and which extends substantially parallel with surface 9'. Thus after first moving under the action of spring 15 in the direction of arrow 18 until it engages with workpiece 12, clamping member 2, will then move in the opposite direction until it engages with clamping member 1' along surface 14 and both members grip workpiece 12 tightly.

Figure 3:
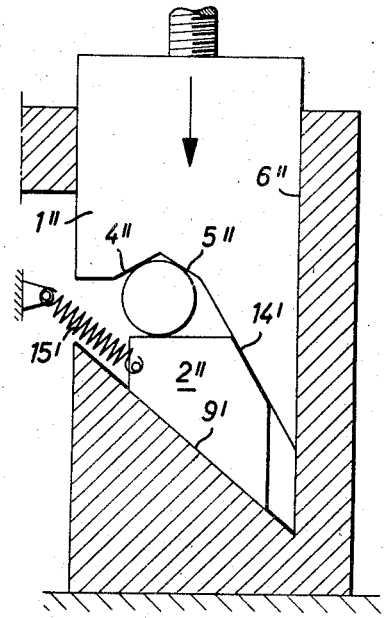
Fig. 3 shows another modification similar to that shown in Fig. 2.

Fig. 3 illustrates a further embodiment of the invention in which the clamping surfaces 4" and 5" of clamping member 1" are disposed at an angle of more than 90° to each other. In such a case it will be necessary to dispose surface 14' of member 1" at such an angle relative to surface 9" of member 2" and the corresponding surface of the stationary member 11" that, when clamping member 1" is shifted in the direction shown by the arrow and spring 15' draws member 2" in a direction substantially parallel to surface 9", the engagement of members 1" and 2" along surface 14' will have the tendency to move member 2" in the opposite direction and into a firm gripping engagement upon the workpiece.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. A device for clamping workpieces having circular cross-sections, comprising in combination, first guide means having a first straight guide surface; a first clamping member guided along said first guide surface for rectilinear movement in one direction, said first clamping member having a prismatic recess bounded by two clamping faces symmetrically inclined to a plane of symmetry extending in said direction, said clamping faces being adapted to abut on workpieces of different circular cross-sections with the axes of the workpieces located in said plane during movement of said first clamping member along said first guide surface, said first clamping member including a projecting portion adjacent said recess having a first guide face adjacent said recess and inclined to said plane; second guide means having a second straight guide face extending inclined to said first guide surface and to said first guide face and defining a space with the latter and with said recess; a second clamping member located in said space and having two guide faces slidably engaging said first and second guide faces, respectively, said second clamping member having a clamping face extending perpendicularly to said first guide surface and to said plane and being movable along said first and second guide faces to and from a position in which said clamping face thereof is located opposite said recess and adapted to abut on a workpiece located in said recess, said clamping faces forming in all positions of said first and second clamping members three sides of a triangle into which the circular circumference of a clamped workpiece is inscribed with the axes of all clamped workpieces in the same position with respect to said first and second guide means.

2. A clamping device as set forth in claim 1 wherein one of said clamping faces of said first clamping member is located in the plane of said first guide face.

3. A clamping device as set forth in claim 1 wherein said first guide face is inclined at an acute angle to said plane of symmetry, and wherein said second guide face is inclined at an acute angle with respect to said first guide face.

4. A clamping device as set forth in claim 1 and including a spring connected to said second clamping member and urging same to move along said second guide face and toward said recess so that said clamping face of said second clamping member moves toward said recess so as to engage a workpiece therein.

5. A clamping device as set forth in claim 1 wherein said clamping faces of said recess define an angle of at least 90°, and wherein said first guide face extends at an obtuse angle to the adjacent clamping face of said recess.

6. A clamping device as set forth in claim 1 wherein said first guide means and second guide means are integral, and wherein said first and second straight guide faces form a guide recess in said guide means.

7. A device for clamping workpieces having circular cross-sections, the device comprising, in combinations, first guide means having first straight guide surface means; a first clamping means guided along said first guide surface means for rectilinear movement in one direction, said first clamping means having two clamping face means symmetrically inclined to a plane of symmetry extending in said direction, said clamping face means being adapted to abut on workpieces of different circular cross-sections with the axes of the workpieces located in said plane during movement of said first clamping member along said first guide surface means, said first clamping means having first guide face means inclined to said plane; second guide means having a second straight guide face means extending inclined to said first guide surface means and to said first guide face means; a second clamping means having two guide face means slidably engaging said first and second guide face means, respectively, said second clamping means having a clamping face means extending perpendicularly to said first guide surface means and to said plane and being movable along said first and second guide face means to and from a position in which said clamping face means thereof is adapted to abut on a workpiece on which said clamping face means abut, said clamping face means forming in all positions of said first and second clamping means the outline of a prismatic space of triangular cross-section into which the circular circumference of a clamped workpiece is inscribed with the axes of all clamped workpieces in the same position with respect to said first and second guide means.

References Cited in the file of this patent

UNITED STATES PATENTS

| | | |
|---|---|---|
| 593,649 | Goodrich | Nov. 16, 1897 |
| 1,157,120 | Myhre | Oct. 19, 1915 |